(12) United States Patent
Wang et al.

(10) Patent No.: US 8,619,447 B2
(45) Date of Patent: Dec. 31, 2013

(54) SINGLE PHASE CURRENT SOURCE POWER INVERTERS AND RELATED METHODS

(75) Inventors: Bingsen Wang, Okemos, MI (US); Craig R. Bush, Tempe, AZ (US)

(73) Assignee: Arizona Board of Regents, a body corporate of the State of Arizona, Acting for and on behalf of Arizona State University, Scottsdale, AZ (US)

( * ) Notice: Subject to any disclaimer, the term of this patent is extended or adjusted under 35 U.S.C. 154(b) by 295 days.

(21) Appl. No.: 13/075,579

(22) Filed: Mar. 30, 2011

(65) Prior Publication Data

US 2011/0242867 A1    Oct. 6, 2011

Related U.S. Application Data

(60) Provisional application No. 61/319,756, filed on Mar. 31, 2010.

(51) Int. Cl.
*H02M 7/537* (2006.01)
*H02M 7/5387* (2007.01)

(52) U.S. Cl.
USPC .......................................... 363/131; 363/132

(58) Field of Classification Search
USPC ............................ 323/311, 906; 363/131, 132
See application file for complete search history.

(56) References Cited

U.S. PATENT DOCUMENTS

| 5,031,087 | A | * | 7/1991 | Tuusa | 363/63 |
| 5,625,539 | A | * | 4/1997 | Nakata et al. | 363/17 |
| 6,452,289 | B1 | * | 9/2002 | Lansberry et al. | 307/25 |
| 7,324,361 | B2 | * | 1/2008 | Siri | 363/95 |
| 2008/0049474 | A1 | * | 2/2008 | Tan et al. | 363/123 |
| 2009/0160258 | A1 | * | 6/2009 | Allen et al. | 307/82 |
| 2010/0085784 | A1 | * | 4/2010 | Chou et al. | 363/45 |

FOREIGN PATENT DOCUMENTS

WO    97/45909    12/1997

OTHER PUBLICATIONS

Bush C et al. (2009). "A Single-Phase Current Source Solar Inverter with Reduced-Size DC Link," Proceedings of the IEEE Energy Conversion Congress and Exposition, San Jose, CA, Sep. 20-24 2009, pp. 54-59.

Chen Y et al. (2006). "A Cost-Effective Three-Phase Grid-Connected Inverter With Maximum Power Point Tracking," in Record of IEEE Industry Applications Society Annual Meeting, vol. 2, Tampa, Florida, pp. 995-1000.

Chung S (2000). "A Phase Tracking System for Three Phase Utility Interface Inverters," IEEE Transactions on Power Electronics vol. 15(2), pp. 431-438.

(Continued)

*Primary Examiner* — Adolf Berhane
*Assistant Examiner* — Emily P Pham
(74) *Attorney, Agent, or Firm* — Bryan Cave LLP

(57) ABSTRACT

Some embodiments include an apparatus. The apparatus includes a DC source port having a first DC source terminal and a second DC source terminal. Further, the apparatus includes a first switch, a second switch, and a third switch having first terminals coupled together, and the apparatus includes a fourth switch between the first switch and the second DC source terminal, a fifth switch between the second switch and the second DC source terminal, and a sixth switch between the third switch and the second DC source terminal. Also, the apparatus includes a first inductor coupled between the first DC source terminal and the first terminals of the first, second, and third switches, and a power grid port having a first power grid terminal and a second power grid terminal. Other related systems and methods are also disclosed.

32 Claims, 8 Drawing Sheets

(56) References Cited

OTHER PUBLICATIONS

Daniel S et al. (2004). "A Novel Hybrid Isolated Generating System Based on PV Fed Inverter-Assisted Wind-Driven Induction Generators," IEEE Transactions on Energy Conversion vol. 19(2), pp. 416-422.

Haque M et al. (2002). "Implementation of Single-Phase PQ Theory," in Proceedings of Power Conversion Conference, Osaka, Japan, pp. 761-765.

Lai R et al. (2008). "A Systematic Topology Evaluation Methodology for High-Density Three-Phase PWM AC-AC Converters," IEEE Transactions on Power Electronics vol. 23(6), pp. 2665-2680.

Margolis R (2006). "A Review of PV Inverter Technology Cost and Performance Projections," National Renewable Energy Laboratory, NREL/SR-620-38771.

"Renewables Global Status Report," (2009), retrieved from http://www.ren21.net on Mar. 5, 2013.

Ryan M et al. (1997). "Control Topology Options for Single-Phase UPS Inverters," IEEE Transactions on Industry Applications vol. 22(2), pp. 493-501.

Saito M et al. (2008). "A Single to Three-Phase Matrix Converter for a Vector-Controlled Induction Motor," in Record of IEEE Industry Applications Society Annual Meeting, Edmonton, Canada, pp. 1-6.

Wang B et al. (2003). "DSP-Controlled, Space-Vector PWM, Current Source Converter for STATCOM Application," Electric Power Systems Research vol. 67(2), pp. 123-131.

Wang B et al. (2009). "Dynamic Voltage Restorer Utilizing a Matrix Converter and Flywheel Energy Storage," IEEE Transactions on Industry Applications vol. 45(1), pp. 222-231.

Wang B et al. (2006). "Operation and Control of a Dynamic Voltage Restorer Using Transformer Coupled H-Bridge Converters," IEEE Transactions on Power Electronics vol. 21(4), pp. 1053-1061.

Wang B et al. (2007). "Unity Power Factor Control for Three Phase Three Level Rectifiers Without Current Sensors," IEEE Transactions on Industry Applications vol. 43(5), pp. 1341-1348.

Libo W et al. (2007), "A Single-Stage Three-Phase Grid-Connected Photovoltaic System With Modified MPPT Method and Reactive Power Compensation," IEEE Transactions on Energy Conversion vol. 22(4), pp. 881-886.

Neba Y et al. (1998), "Calculation of Maximum Power in a Utility-Interactive Photovoltaic-Generating System by Using PWM Current-Source Inverter", Electrical Engineering in Japan, vol. 125(1), pp. 55-64.

Sahan B et al. (2008), "A Single-Stage PV Module Integrated Converter Based on a Low-Power Current-Source Inverter", IEEE Transactions on Industrial Electronics, vol. 55(7), pp. 2602-2609.

Wang et al. (2008), "Buck-Boost DC-AC Converters Suitable for Renewable Applications", IEEE Energy2030.

* cited by examiner

SINGLE PHASE CURRENT SOURCE POWER INVERTERS AND RELATED METHODS

CROSS-REFERENCE TO RELATED APPLICATIONS

This application claims the benefit of U.S. Provisional Application No. 61/319,756, filed Mar. 31, 2010, which is incorporated herein by reference.

BACKGROUND

The increased demand for clean or "green" energy as an alternative to the conventional fossil-fuel based power generation has been a strong driving force for recent developments in photovoltaic (PV) technologies. For example, electrical power inverters are currently being used to convert direct current (DC) power from green energy sources, such as from PV panels, into alternating current (AC) power compatible with AC power grids. Nevertheless, the power inverter still remains the weak link in PV power systems, particularly in terms of reliability. The typical lifetime of a power inverter is 5-10 years, compared to the 30-year lifetime of PV panels. The shortened lifetime of the power inverter not only increases effective operating costs, but also poses a significant stress on the environment according to life cycle analyses. The increased cost and waste limitations of existing power inverters contradicts one of the goals of renewable energy generation: relieving detrimental effects to the environment.

Accordingly, a need or potential for benefit exists for an system and/or method that allows power inversion with less or no detrimental effects to the environment.

BRIEF DESCRIPTION OF THE DRAWINGS

To facilitate further description of the embodiments, the following drawings are provided in which.

Figure 1:
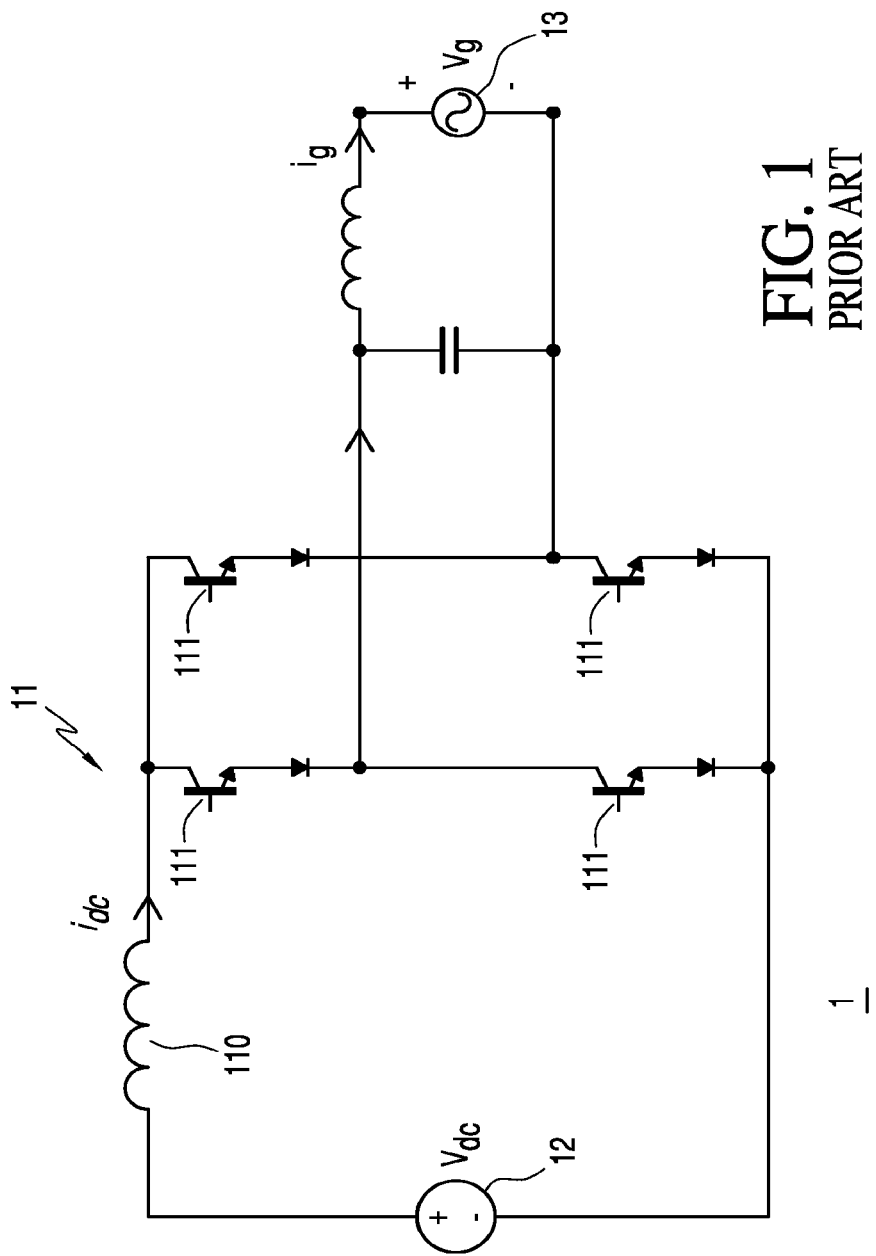
FIG. 1 illustrates a schematic of a prior art power converter system.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

An electrical "coupling" and the like should be broadly understood and include coupling involving any electrical signal, whether a power signal, a data signal, and/or other types or combinations of electrical signals. A mechanical "coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include an apparatus. The apparatus can comprise a DC source comprising a first DC source terminal and a second DC source terminal. The apparatus can comprise a first switch, a second switch, and a third switch wherein first terminals of the first, second, and third switches are coupled together. The apparatus can comprise a fourth switch between the first switch and the second DC source terminal, a fifth switch between the second switch and the second DC source terminal, and a sixth switch between the third switch and the second DC source terminal. The apparatus can comprise an inductor coupled between the first DC source terminal and the first terminals of the first, second, and third switches. The apparatus can comprise a power grid port comprising a first power grid terminal and a second power grid terminal. The apparatus can comprise a first electrical path between a second terminal of the first switch and the first power grid terminal and a second electrical path between a second terminal of the second switch and the second power grid terminal. The apparatus can comprise a capacitor and a third electrical path through the capacitor and between a second terminal of the third switch and the second power grid terminal. The apparatus can comprise a second inductor between the first switch and the first power grid terminal and between the fourth switch and the first power grid terminal. The apparatus can comprise a second capacitor between the first switch and the second power grid terminal and between the fourth switch and the second power grid terminal. In some embodiments, the first, second, and third switches can be configured to distribute portions of a DC link current through the apparatus. In the same or different embodiments, the capacitor can be larger than the second capacitor. In the same or different embodiments, the inductor can be larger than the second inductor. In the same or different embodiments, power ratings of the first and second switches can be greater than a power rating of the third switch and power ratings of the fourth and fifth switches can be greater than a power rating of the sixth switch. In the same or different embodiments, at least one of the first, second, third, fourth, fifth, or sixth switches can comprise at least one of a GTO switch, an IGBT switch, a BJT switch, a bipolar transistor switch, a field effect transistor switch, or a MOSFET switch. In the same or different embodiments, the inductor can comprise an inductance of between approximately 1 millihenry and approximately 10 millihenries. In the same or different embodiments, the capacitor can comprise a capacitance of between approximately 100 microfarads and approximately 200 microfarads. In the same or different embodiments, the third switch can be configured to route an alternating current portion of the DC link current through the capacitor to attenuate a current ripple effect of the DC link current and improve a maximum power point tracking of the apparatus.

Various embodiments include an apparatus. The apparatus can comprise a DC source comprising a first DC source terminal and a second DC source terminal. The apparatus can comprise a first switch, a second switch, and a third switch wherein first terminals of the first, second, and third switches are coupled together. The apparatus can comprise a first feedback loop from a second terminal of the first switch to the first terminal of the first switch, a second feedback loop from a second terminal of the second switch to the first terminal of the second switch, and a third feedback loop from a second terminal of the third switch to the first terminal of the third switch. The apparatus can comprise an inductor coupled between the first DC source terminal and the first terminals of the first, second, and third switches. The apparatus can comprise a power grid port comprising a first power grid terminal and a second power grid terminal. The apparatus can comprise a first electrical path between the first feedback loop and the first power grid terminal and a second electrical path between the second feedback loop and the second power grid terminal. The apparatus can comprise a capacitor and a third electrical path through the capacitor and between the third feedback loop and the second power grid terminal. The apparatus can comprise a second inductor between the first feedback loop and the first power grid terminal and a second capacitor between the first feedback loop and the second power grid terminal. In some embodiments, the first, second, and third switches can be configured to distribute portions of a DC link current through the apparatus. In the same or different embodiments, the capacitor can be larger than the second capacitor. In the same or different embodiments, the inductor can be larger than the second inductor. In the same or different embodiments, power ratings of the first and second switches can be greater than a power rating of the third switch. In the same or different embodiments, at least one of the first, second, and third switches can comprise at least one of a GTO switch, an IGBT switch, a BJT switch, a bipolar transistor switch, a field effect transistor switch, or a MOSFET switch. In the same or different embodiments, the inductor can comprise an inductance of between approximately 1 millihenry and approximately 10 millihenries. In the same or different embodiments, the capacitor can comprise a capacitance of between approximately 100 microfarads and approximately 200 microfarads. In the same or different embodiments, the third switch is configured to route an alternating current portion of the DC link current through the capacitor to attenuate a current ripple effect of the DC link current and improve a maximum power point tracking of the apparatus.

Further embodiments include a method. The method can comprise: routing power from a DC source to a power grid via a single phase current source inverter; and attenuating a variable component of the power to improve a maximum power point tracking of the current source inverter.

Other embodiments include a bridge circuit. The bridge circuit comprises a DC source port comprising a first DC source terminal and a second DC source terminal. The bridge circuit can comprise a switch set comprising at least three switches coupled together. The bridge circuit can comprise an inductor coupled between the first DC source terminal and the switch set. The bridge circuit can comprise a power grid port comprising a first power grid terminal coupled to a first switch of the switch set and a second power grid terminal coupled to a second switch of the switch set. The bridge circuit can comprise a capacitor coupled between a third switch of the switch set and the second power grid terminal. In some embodiments, the first and second DC source terminals are configured to couple the bridge circuit to a DC source.

One of the key issues affecting the reliability and performance of prior power inverters includes electrolytic capacitors that are commonly used in power inverters of the popular voltage source inverter (VSI) topology. The less frequently researched current source inverter (CSIs), however, can eliminate the electrolytic capacitors while providing additional benefits. In addition, the proposed CSI topology disclosed herein provides further benefits over traditional CSI topologies, as described below.

The disclosure herein presents a new CSI power inverter topology that can be applicable to single-phase power applications. As a result, an embodiment of the present invention is useful for residential power systems having power ratings below approximately 10 kilowatts (kW), where single-phase applications predominate. In some embodiments, the present invention is also useful for applications having power ratings at or above 10 kW. In comparison with the existing power inverter technology, the proposed topology aims to: a) eliminate or at least minimize the low frequency (double of line frequency) AC ripple that is common to single-phase inverters; b) reduce the size of passive components of the electric inverter; and c) improve the maximum-power-point-tracking (MPPT) performance of the electric inverter. In some examples, with respect to prior art embodiments, the embodiments described herein and variations thereof can be used to improve achievable reliability by a factor of 2 to 3 times, considering the elimination of electrolytic capacitors. In addition, the cost reduction is estimated to be at around 30% when both initial and operations costs are considered. An energy yield improvement of around 5% or more can also be achieved pursuant to the disclosure herein over prior art embodiments.

Figure 2:
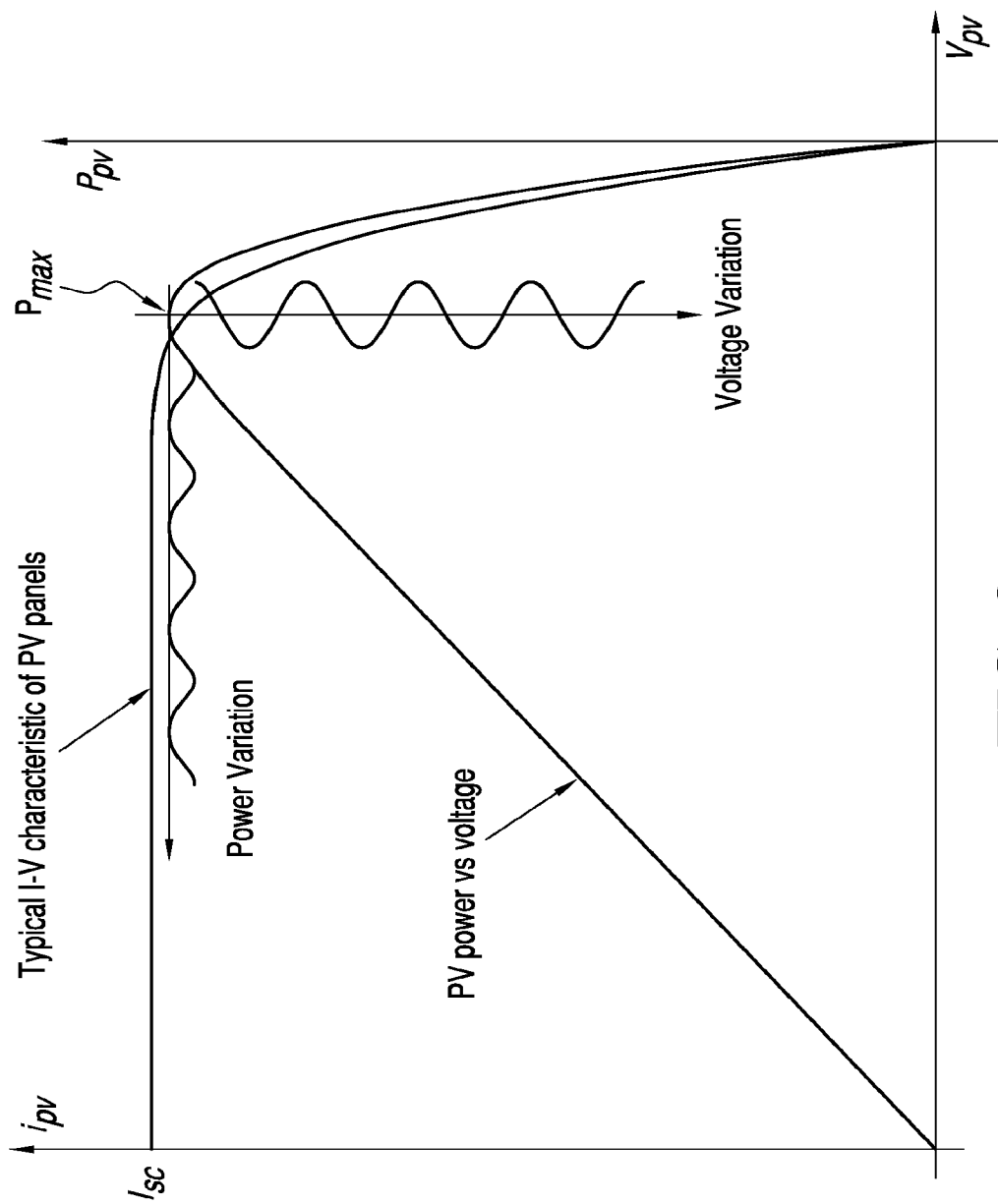
FIG. 2 illustrates a Maximum Power Point Tracking chart for power inverter circuits, illustrating how low frequency alternating current ripple can affect the maximum power of power converter circuits such as the prior art power converter system of FIG. 1.

Referring to the figures, FIG. 1 illustrates a schematic of a prior art power converter system 1 comprising a CSI topology. FIG. 2 shows a Maximum Power Point Tracking chart for power inverter circuits, illustrating how low frequency alternating current ripple can affect the maximum power of power converter circuits such as power converter 1.

As shown in FIG. 1, power converter system 1 comprises power converter 11 coupled between DC source 12 and single phase power grid 13, and having switches 111 to regulate DC-link current $i_{dc}$. In general, for single phase power converter systems such as power converter system 1, the grid voltage $v_g$ and the current $i_g$ injected to power grid 13 by a power converter such as power converter 11 are given by Equation 1, where V and I are magnitudes of the grid voltage and grid current supplied by the power converter, respectively, $\phi$ is the phase angle difference between the voltage and the current, also known as the power factor angle, t is the time, and $\omega$ is the frequency.

$$v_g(t)=V\cos\omega t; i_g(t)=I\cos(\omega t+\phi) \qquad \text{Equation 1}$$

Accordingly, the instantaneous power flow across a power converter is given by Equation 2.

$$p(t) = v(t)i(t) = \underbrace{\frac{1}{2}VI\cos\phi}_{\text{constant term}} + \underbrace{\frac{1}{2}VI\cos(2\omega t + \phi)}_{\text{time-varying term at twice line frequency}} \qquad \text{Equation 2}$$

In cases where power grid 13 comprised a residential single phase power grid, it would oscillate at a low line frequency of about 60 Hertz. Based on Equation 2, the power converter 11 would then exhibit a time-varying term that would introduce current and/or voltage ripple at twice the line frequency (120 Hertz). As can be seen in FIG. 2, such low frequency ripple limits the effectiveness and/or maximum power point tracking (MPPT) of power converter system 1. The voltage variation induces power variation, such that power converter 11 deviates from its maximum power point $P_{max}$ in FIG. 2 except for discrete points in time where voltage variation is at zero. As a result, the effectiveness of power converter system 1 is diminished, and the utilization of DC source 12 to convert power for power grid 13 is thus limited by the ripple effect.

The low frequency ripple (e.g., about 120 Hertz) requires the use of large-sized passive components, such as inductor 110, to ensure proper operation of power converter system 1. For example, because inductor impedance ($Z_L=\omega L$) is proportional to frequency ($\omega$), the inductance (L) of inductor 102 for power converter 11 will have to be large to compensate for the low frequency $\omega$ of about 120 Hertz and thereby present sufficient impedance to the harmonic voltages that cause low frequency ripple. Such countermeasures increase the size and cost of power converter 11.

The present disclosure addresses the limitations described above. In one embodiment in accordance with the present invention, a bridge circuit comprises a DC source port comprising first and second DC source terminals, and a switch set comprising at least three switches coupled together, where an inductor is coupled between the first DC source terminal and the switch set. The bridge circuit also comprises a power grid port comprising a first power grid terminal coupled to a first switch of the switch set, and a second power grid terminal coupled to a second switch of the switch set. A capacitor is coupled between a third switch of the switch set and the second power grid terminal. The first and second DC source terminals are configured to couple the bridge circuit to a DC source. Other examples, embodiments, and related methods are further described below.

Figure 3:
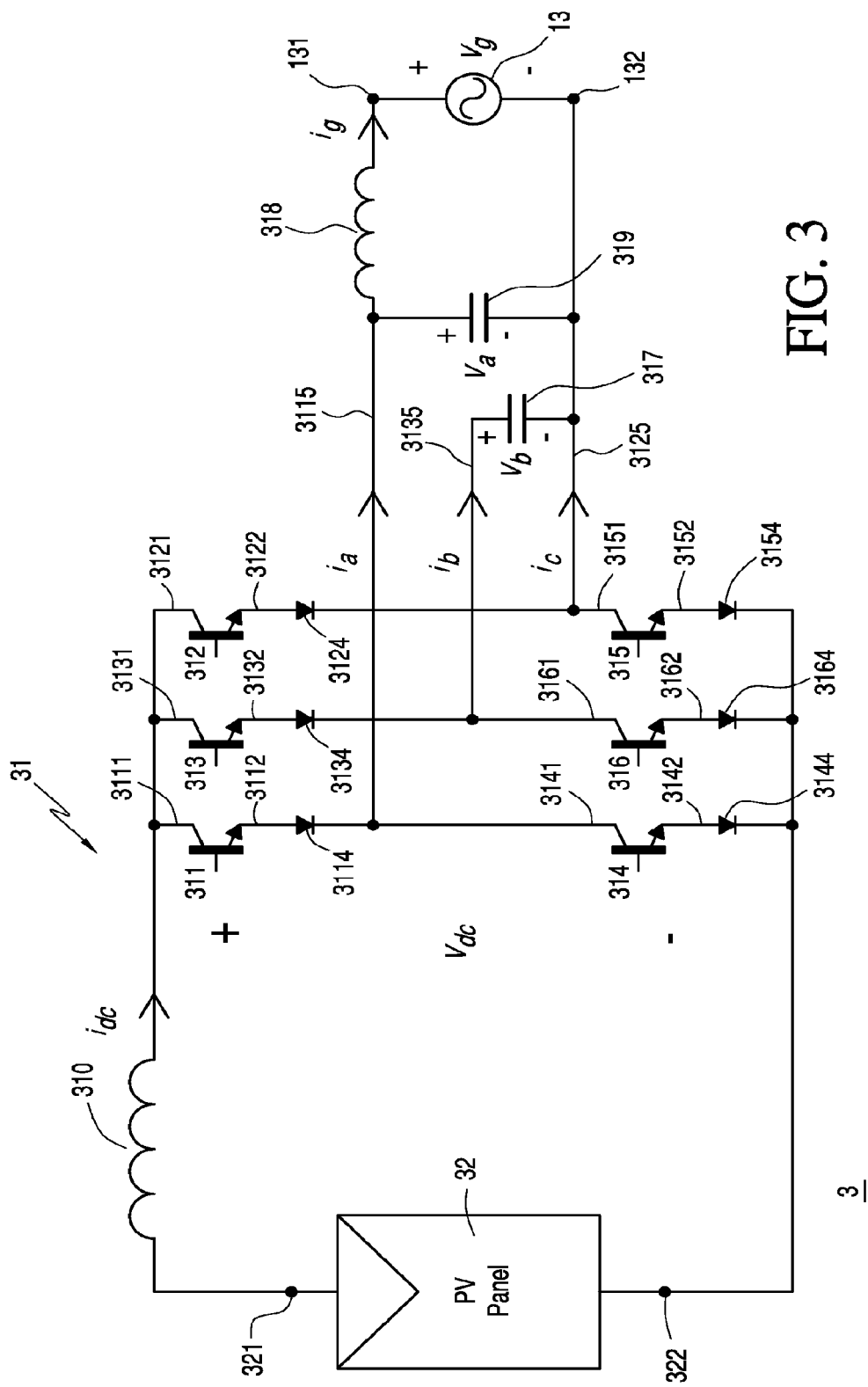
FIG. 3 illustrates a schematic of a power converter system, according to an embodiment.

Continuing with the figures, FIG. 3 illustrates a schematic of a power converter system 3 in accordance with one embodiment of the present invention. In some examples, power converters can be referred to as power inverters or bridge circuits. Power converter system 3 comprises power converter 31 coupled between a DC source port comprising DC source terminals 321-322 and a power grid port comprising power grid terminals 131-132.

In the present example, the DC source port is shown coupled to DC source 32, while the power grid port is shown coupled to power grid 13. Also in the present example, the DC source port is shown as wires for DC source terminals 321-322, although in other embodiments the DC source port can include a physical port, harness, enclosure, or other similar engagement mechanisms. Similarly, the power grid port is shown as wires for power grid terminals 131-132, although in other embodiments the power grid port can include a physical port, harness, enclosure, or other similar engagement mechanisms.

In some embodiments, power converter 31 may comprise a stand-alone circuit that can be coupled or decoupled to or from DC source 32 and/or power grid 13. In the same or a different embodiment, power converter 31 may be implemented as one or more semiconductor chips and/or discrete components on one or more printed circuit boards. In the same or a different embodiment, power converter 31 may be combined with one or more other circuits into one or more semiconductor chips or printed circuit boards. There may also be embodiments where power converter 31 is integrated as part of DC source 32 and/or power grid 13.

In the present example, power converter 31 comprises a single phase CSI circuit. DC source 32 can be similar to DC source 12 (FIG. 1), and comprises one or more PV panels as shown in FIG. 3. DC source 32 is coupled to power converter 31 at a DC source port between DC source terminals 321-322, while power grid 13 is coupled to power converter 31 at a power grid port between power grid terminals 131-132. In some embodiments, DC source 32 can be detachable from the DC source port and/or the power grid port converter 31.

Power converter 31 comprises an inductor 310 coupled to DC source terminal 321 of the DC source port. Inductor 310 can be similar to inductor 110 (FIG. 1), but differs at least in terms of inductance, where inductor 310 can properly smoothen DC-link current $i_{dc}$ for power converter 31 at a much lower inductance than possible with inductor 110 for power converter 11 (FIG. 1) or other prior art single phase power converters. As will be further detailed below, because of the higher frequencies at which power converter 31 is operated, relative to power converter 11 (FIG. 1), inductor 310 can provide sufficient impedance at lower inductance for such higher frequencies than would be possible for inductor 110 at the lower frequencies of power converter 11. In some examples, the difference in size or inductance between inductors 310 and 110 is over a factor of 10, where inductor 310 can comprise 10% or less of the inductance of inductor 110 to properly handle similar power conversion requirements. In the same or different examples, inductor 310 can comprise an inductance of between approximately 1 millihenries to approximately 10 millihenries.

Power converter 31 also comprises a switch set with at least three switches coupled together, where the switch set comprises switches 311-316 in the present example. Switches 311-313 are coupled together at respective terminals 3111, 3121, and 3131. In addition, terminal 3112 of switch 311 couples to power grid terminal 131 via electrical path 3115, while terminal 3122 of switch 312 couples to power grid terminal 132 via electrical path 3125. The embodiment of FIG. 3 also presents switch 314 with terminal 3141 coupled to terminal 3112 of switch 311, switch 315 with terminal 3151 coupled to terminal 3122 of switch 312, and switch 316 with terminal 3161 coupled to terminal 3132 of switch 313. Terminals 3142, 3152, and 3162 of switches 314-316, respectively, are coupled together and to DC source terminal 322. In some embodiments, each switch of the switch set of power converter 31 can comprise at least one of a gate turn-off (GTO) switch, an insulated-gate bipolar transistor (IGBT) switch, a bipolar junction transistor (BJT) switch, another type of bipolar transistor, a metal oxide semiconductor field effect transistor (MOSFET) switch, or another type of field effect transistor. In one embodiment, the switches are not thyristors.

In the present example, power converter 31 further comprises capacitor 317 coupled between terminal 3132 of switch 313 and power grid terminal 132, and between terminals 3132 and 3122 of switches 313 and 312, respectively. Terminal 3132 of switch 313 therefore couples through capacitor 317 to power grid terminal 122 via electrical path 3135, which includes a portion of electrical path 3125. Power converter 31 is configured to regulate a portion $i_b$ of DC-link current $i_{dc}$ routed through capacitor 317 to restrict a reactive component of the power transferred from DC source 32 to power grid 12 at the power grid port of power converter 31. In some examples, capacitor 317 can comprise a capacitance of between approximately 100 microfarads and approximately 200 microfarads. In the same or a different example, because switch 313 is configured to mainly handle only the reactive component of the transferred power, switch 313 can comprise a power rating lower than the power rating of switches 311 and/or 312. In the same or a different example, the reactive component can be referred to as an AC component. The use of current $i_b$ to restrict the ripple effect in power converter 31 will be explained below. Similarly, capacitor 317 is also coupled between terminals 3161 and 3151 of switches 316 and 315, respectively, and the power rating of switch 316 can be lower than the power ratings of switches 314 and/or 315. Also, the power ratings of switches 312 and 316 can be similar to each other, and the power ratings of switches 311, 312, 314, and 315 can be similar to each other. Accordingly, switches 312 and 316 can be smaller than switches 311, 312, 314, and 315.

As shown in FIG. 3, the present embodiment also comprises inductor 318 coupled between switch 311 and power grid terminal 131, and capacitor 319 coupled between switch 311 and power grid terminal 132. In the same or a different embodiment, capacitor 319 and inductor 318 can comprise an LC filter. In the present embodiment, the capacitance of capacitor 317 is greater than the capacitance of capacitor 319, while the inductance of inductor 310 is greater than the inductance of inductor 314. In some embodiments, the inductance of inductor 310 can be approximately 2 to 5 times larger than the inductance of inductor 314. Capacitors 317, and 319 are not electrolytic capacitors, but can be film capacitors.

In the embodiment of FIG. 3, power converter 31 also comprises several diodes coupled to switches 311-316. Diode 3114 couples between switch 311 and power grid terminal 131, with its anode coupled to terminal 3112 of switch 311. Diode 3124 couples between switch 312 and power grid terminal 132, with its anode coupled to terminal 3122 of switch 312. Diode 3134 couples between switch 313 and capacitor 317, with its anode coupled to terminal 3132 or switch 313. The anodes of diodes 3144, 3154, and 3164 couple to terminals 3142, 3152, and 3162 of switches 314-316, respectively. Diodes 3144, 3154, and 3164 are also coupled via their respective cathodes to DC source terminal 322. Based on the power ratings described earlier, diodes 3134 can have a lower power rating and be smaller than diodes 3114 and 3124, and diodes 3164 can have a power rating and be smaller than diodes 3144 and 3154. Also, diodes 3134 and 3164 can be similar to each other, and diodes 3114, 3124, 3144, and 3154 can be similar to each other.

The switch set of power converter 31 can be configured in the present example to regulate DC-link current $i_{dc}$ between DC source 32 and power grid 13. For example, switch 311 is configured to regulate portion $i_a$ of DC-link current $i_{dc}$ routed via electrical path 3115. Similarly, switch 312 is configured to regulate portion $i_c$ of DC-link current $i_{dc}$ routed via electrical path 3125. In addition, switch 313 is configured to regulate portion $i_b$ of DC-link current $i_{dc}$ routed through capacitor 317 via electrical path 3135. In some embodiments, power converter 31 can comprise a controller coupled to control terminals of one or more of switches 311-316 of power converter 31, where the controller can be configured to actuate the switch set and thereby regulate currents $i_a$, $i_b$, and $i_c$. In the same or a different embodiment, the controller can be part of, or integrated into, power converter 31. The controller can also comprise a digital signal processor in the same or other embodiments. When actuating the switch set of power converter 31, some constraints may need to be considered. For example, only one of switches 311-313 can be enabled at a time to prevent open circuit and short circuit conditions that could interrupt or affect power flow across power converter 31. Similarly, only one of switches 314-316 can be enabled at the same time described above. With proper control of the current $i_b$, it is possible to achieve constant and instantaneous power flow across power converter 31. The working principle is explained below.

The operation of power converter 31 is based on a modulation of power converter 31 such that an instantaneous power transfer across power converter 31 is constant. As explained below, the instantaneous power transfer can be made constant by proper regulation of target current $i_b$ through capacitor 317. The target magnitude and target phase for target current $i_b$ can be determined according to the following calculations using space vectors.

With respect to voltage, a voltage space vector at power grid terminals 121-122 of power converter 31 can be defined according to Equation 3, where $\alpha = e^{j2\pi/3}$.

$$\underline{v} = \frac{2}{3}(v_a + \alpha v_b + \alpha^2 v_c) \qquad \text{Equation 3}$$

In turn, the three phase voltages of Equation 3 can be defined according to Equation 4:

$$v_a = V_a \cos\omega t; v_b = V_b \cos(\omega t + \phi_{vb}); v_c = 0 \qquad \text{Equation 4}$$

Substitution of Equation 4 into Equation 3 yields Equation 5:

$$\underline{v} = \frac{1}{3}(V_a + \alpha V_b e^{j\phi_{vb}})e^{j\omega t} + \frac{1}{3}(V_a + \alpha V_b e^{-j\phi_{vb}})e^{-j\omega t} \qquad \text{Equation 5}$$

The space vectors $\underline{v}_p$ and $\underline{v}_n$ that correspond to the positive and negative voltage sequence components are defined in Equation 6:

$$\underline{v}_p = \frac{1}{3}(V_a + \alpha V_b e^{j\phi_{vb}})e^{j\omega t}; \qquad \text{Equation 6}$$

$$\underline{v}_n + \frac{1}{3}(V_a + \alpha V_b e^{-j\phi_{vb}})e^{-j\omega t}$$

With respect to current, a current space vector at power grid terminals 121-122 of power converter 31 can be defined according to Equation 7:

$$\underline{i} = \frac{2}{3}(i_a + \alpha i_b + \alpha^2 i_c) \qquad \text{Equation 7}$$

In turn, the three phase currents $i_a$, $i_b$, and $i_c$ of Equation 7 can be defined according to Equation 8, where $\phi$ is the power factor angle, which is 0 for unity power factor operation. The magnitude $I_b$ and phase angle $\phi_{ib}$ of the phase 'b' current is to be determined.

$$i_a = I_a \cos(\omega t + \phi); i_b = I_b \cos(\omega t + \phi_{ib}); i_c = -i_a - i_b \qquad \text{Equation 8}$$

Substitution of Equation 8 into Equation 7 yields Equation 9:

$$\underline{i} = \frac{1}{\sqrt{3}}[I_a e^{j(\phi + \pi/6)} + jI_b e^{j\phi_{ib}}]e^{j\omega t} + \qquad \text{Equation 9}$$

$$\frac{1}{\sqrt{3}}[I_a e^{j(-\phi + \pi/6)} + jI_b e^{-j\phi_{ib}}]e^{-j\omega t}$$

The space vectors $\underline{i}_n$ and $\underline{i}_n$ that correspond to the positive and negative current sequence components are defined in Equation 10:

$$\underline{i}_p = \frac{1}{\sqrt{3}}[I_a e^{j(\phi + \pi/6)} + jI_b e^{j\phi_{ib}}]e^{j\omega t}; \qquad \text{Equation 10}$$

$$\underline{i}_n = \frac{1}{\sqrt{3}}[I_a e^{j(-\phi + \pi/6)} + jI_b e^{-j\phi_{ib}}]e^{-j\omega t}$$

Finally, with respect to power, the instantaneous power flow across the converter can be described by Equation 11, where Re(•) denotes the real part of a complex quantity and "*" denotes the conjugate of a complex variable.

$$p(t) = \frac{3}{2}\text{Re}(\underline{v}\underline{i}^*) = \underbrace{\frac{3}{2}\text{Re}(\underline{v}_p \underline{i}_p^* + \underline{v}_n \underline{i}_n^*)}_{p_1(t)} + \underbrace{\frac{3}{2}\text{Re}(\underline{v}_p \underline{i}_n^* + \underline{v}_n \underline{i}_p^*)}_{p_2(t)} \qquad \text{Equation 11}$$

Substituting Equations 6 and 10 into Equation 11, $p_1(t)$ and $p_2(t)$ can be determined after algebraic manipulations as described in Equation 12, where $p_1(t)$ and $p_2(t)$ represent the DC and AC components, respectively, of the power transferred across power converter 31.

$$p_1(t) = \frac{1}{2}V_a I_a \cos\phi; \qquad \text{Equation 12}$$

$$p_2(t) = \frac{1}{2}[V_a I_a \cos(2\omega t + \phi)] + V_b I_b \cos(2\omega t + \phi_{vb} + \phi_{ib})$$

Because the DC component $p_1(t)$ is constant, the instantaneous power flow p(t) can also be made constant by making the AC component $p_2(t)$ equal to zero. Based on the relation between voltage $v_b$ across capacitor 317, and current $i_b$ through capacitor 317, Equation 13 describes the magnitude and phase of current $i_b$ as:

$$I_b = \omega C_b V_b; \phi_{ib} = \phi_{vb} + \pi/2 \qquad \text{Equation 13}$$

Solving Equation 12 to cancel the AC component of the instantaneous power flow, $p_2(t)$ will be zero when current $i_b$ has the target magnitude and target phase listed in Equation 14:

$$I_b = \sqrt{\omega C_b V_a I_a}; \phi_{ib} = \frac{1}{2}(\phi - \pi/2) \qquad \text{Equation 14}$$

Equation 14 describes the necessary conditions for constant and instantaneous power flow across the power converter 31. Maintaining current $i_b$ at the target magnitude $I_b$ and target phase $\phi_{ib}$ of Equation 14 can lead to a substantial or complete cancellation of the ripple effect associated with $p_2(t)$, thereby improving the maximum power point tracking of power converter system 3 to approximate maximum power point $p_{max}$ (FIG. 2). Referring again to FIG. 3, the switch set of power converter 31 can be configured to maintain current $i_b$ substantially at target magnitude $I_b$ and target phase $\phi_{ib}$ when actuated, for example, by the controller coupled to the controlled terminals of switches 311-316. When the switch set of power converter 31 is thus properly actuated to maintain target magnitude $I_b$ and target phase $\phi_{ib}$, power converter 31 can generate substantially constant and instantaneous power transfer from DC source 32 to power grid 13.

In the present embodiment, the switch set of power converter 31 can be switched via a carrier based pulse width modulation mechanism configured to maintain target magnitude $I_1$, and target phase $\phi_{ib}$ of current $i_b$. In other embodiments, the switch set could be cycled based on other modulation mechanisms, such as a space vector modulation mechanism. For power converter 31 and similar embodiments, the switch set can be cycled in accordance with the modulation mechanism based on comparisons between the magnitude of a modulation carrier signal and modulation functions for switches 311-316. The derivation of modulation functions for switches 311-316 is described below.

With the aid of Equation 14, the positive and negative sequences of the current vectors in Equation 10 can be rewritten according to Equation 15:

$$i_p = \frac{1}{\sqrt{3}}\left[I_a e^{j(\phi+\pi/6)} + \sqrt{\omega C_b V_a I_a}\, e^{j(\phi/2+\pi/4)}\right]e^{j\omega t} \quad \text{Equation 15}$$

$$i_n = \frac{1}{\sqrt{3}}\left[I_a e^{j(\phi+\pi/6)} + \sqrt{\omega C_b V_a I_a}\, e^{-j(\phi/2-\pi/4)}\right]e^{-j\omega t}$$

Using Equation 15, the corresponding positive and negative sequence components of the modulation space vectors can be defined per Equation 16:

$$m_p = \frac{i_p}{I_{dc}}; \quad m_n = \frac{i_n}{I_{dc}} \quad \text{Equation 16}$$

The modulation functions $m_{au}$, $m_{cu}$, $m_{bu}$, $m_{al}$, $m_{cl}$, and $m_{bl}$ for switches 311-316, respectively, of power converter 31 can be determined based on positive sequence components $m_{aup}$, $m_{bup}$, $m_{cup}$, $m_{alp}$, $m_{blp}$, $m_{clp}$ and negative sequence components $m_{aun}$, $m_{bun}$, $m_{cun}$, $m_{aln}$, $m_{bln}$, $m_{cln}$ derived from Equation 16. For the positive sequence components, the modulation functions are given by Equation 17:

$$m_{aup} = m_{ap}\Phi(m_{ap}) + m_{p0} \quad \text{Equation 17}$$
$$m_{alp} = -m_{ap}\Phi(-m_{ap}) + m_{p0}$$
$$m_{bup} = m_{bp}\Phi(m_{bp}) + m_{p0}$$
$$m_{blp} = -m_{bp}\Phi(-m_{bp}) + m_{p0}$$
$$m_{cup} = m_{cp}\Phi(m_{cp}) + m_{p0}$$
$$m_{clp} = -m_{cp}\Phi(-m_{cp}) + m_{p0}$$

where $\Phi(x) = \begin{cases} 1 & \text{if } x > 0 \\ 0 & \text{otherwise} \end{cases}$ and $$m_{p0} = \frac{\frac{|m_p|}{|m_p|+|m_n|} - \max(m_{ap}, m_{bp}, m_{cp})}{3}.$$

Similarly, for the negative sequence components, the modulation functions are given by Equation 18:

$$m_{aun} = m_{an}\Phi(m_{an}) + m_{n0} \quad \text{Equation 18}$$
$$m_{aln} = -m_{an}\Phi(-m_{an}) + m_{n0}$$
$$m_{bun} = m_{bn}\Phi(m_{bn}) + m_{n0}$$
$$m_{bln} = -m_{bn}\Phi(-m_{bn}) + m_{n0}$$
$$m_{cun} = m_{cn}\Phi(m_{cn}) + m_{n0}$$
$$m_{cln} = -m_{cn}\Phi(-m_{cn}) + m_{n0}$$

where $$m_{n0} = \frac{\frac{|m_n|}{|m_p|+|m_n|} - \max(m_{ap}, m_{bp}, m_{cp})}{3}.$$

Figure 4:
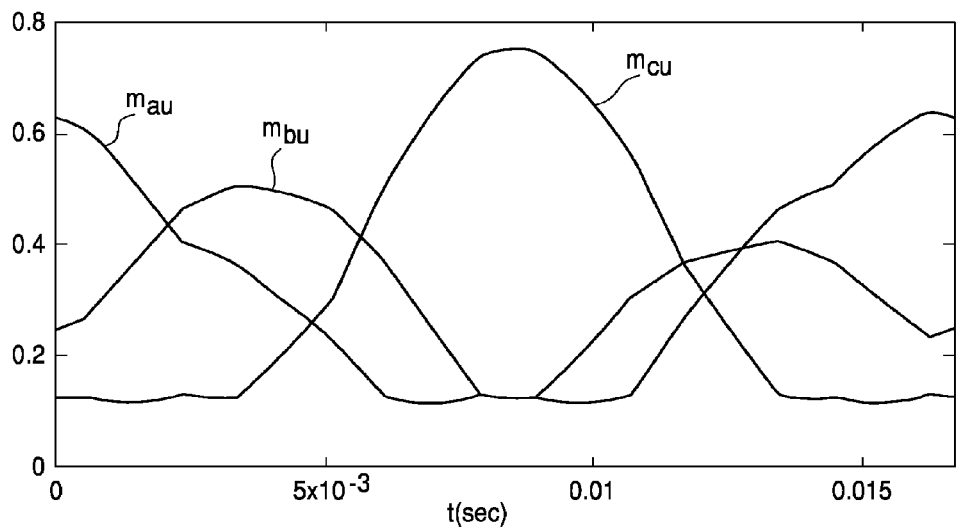
FIG. 4 illustrates a plot of modulation functions $m_{au}$, $m_{cu}$, and $m_{bu}$ for three switches of a power converter of a power converter system over a modulation period, according to the embodiment of FIG. 3.
Figure 5:
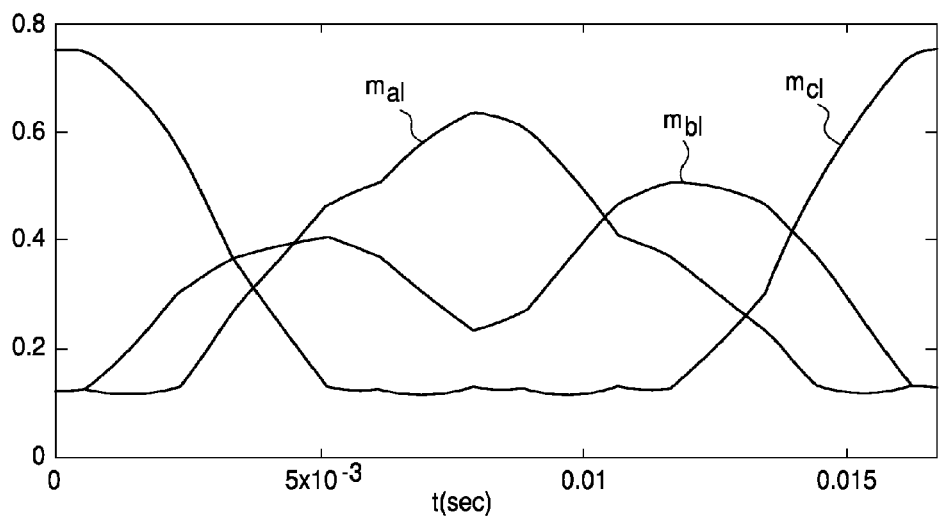
FIG. 5 illustrates a plot of modulation functions $m_{al}$, $m_{cl}$, and $m_{bl}$ for three additional switches of the power converter of FIG. 4 over the modulation period, according to the embodiment of FIG. 3.

FIG. 4 presents a plot of the modulation functions $m_{au}$, $m_{cu}$, and $m_{bu}$ for respective switches 311-313 of power converter 31 over a modulation period, as derived from Equations 17-18. Similarly, FIG. 5 presents a plot of the modulation functions $m_{al}$, $m_{cl}$, and $m_{bl}$ for respective switches 314-316 of power converter 31 over the modulation period, as derived from Equations 17-18. FIGS. 4-5 summarize the target duty cycle for switches 311-316 across the modulation period to maintain target magnitude $I_b$ and target phase $\phi_{ib}$, and have been drawn according to Equation 19 to combine the positive and negative sequence components of the modulation functions of Equations 17-18, where:

$$m_{au} = m_{aup} = m_{aun} m_{al} = m_{alp} + m_{aln}$$

$$m_{bu} = m_{bup} + m_{bun} m_{bl} = m_{blp} + m_{bln}$$

$$m_{cu} = m_{cup} + m_{cun} m_{cl} = m_{clp} + m_{cln} \quad \text{Equation 19}$$

In the present example of FIGS. 3-5, the modulation period for the modulation functions of Equation 19 is based on a frequency of power grid 13. For example, in the United States, power grids tend to run at a frequency of 60 Hertz, such that the modulation period for FIGS. 4-5 is based on a period of about 16.7 milliseconds. Power grids in other countries or scenarios, including residential power grids and/or or public power grids, may be operated at different frequencies. In such scenarios, the modulation functions of Equation 19 may be adjusted to account for modulation periods corresponding to power grid frequencies of between approximately 50 Hertz and approximately 150 Hertz.

The modulation functions of Equations 17-19, when compared with the modulation carrier signal for the modulation mechanism of power converter 31, can be used to actuate the switches of power converter 31 according to respective switching functions $h_{au}(t)$, $h_{cu}(t)$, $h_{bu}(t)$, $h_{al}(t)$, $h_{cl}(t)$, $h_{bl}(t)$ for switches 311-316, respectively, where the switching functions correspond to Equation 20:

$$h_x(t) = \begin{cases} 1 & \text{if Switch}_x \text{ is turned on} \\ 0 & \text{if Switch}_x \text{ is turned off} \end{cases} \quad \text{Equation 20}$$

For CSI's like power converter 31, the avoidance of open circuit conditions for DC-link current $i_{dc}$ and of short circuit conditions for AC voltages such as $v_a$ and $v_b$ require that only one of switches 311-313 and only one of switches 314-316 be turned on at any instant of time, as described by Equation 21:

$$h_{au}(t) + h_{bu}(t) + h_{cu}(t) = 1$$

$$h_{al}(t) + h_{bl}(t) + h_{cl}(t) = 1 \quad \text{Equation 21}$$

Figure 6:
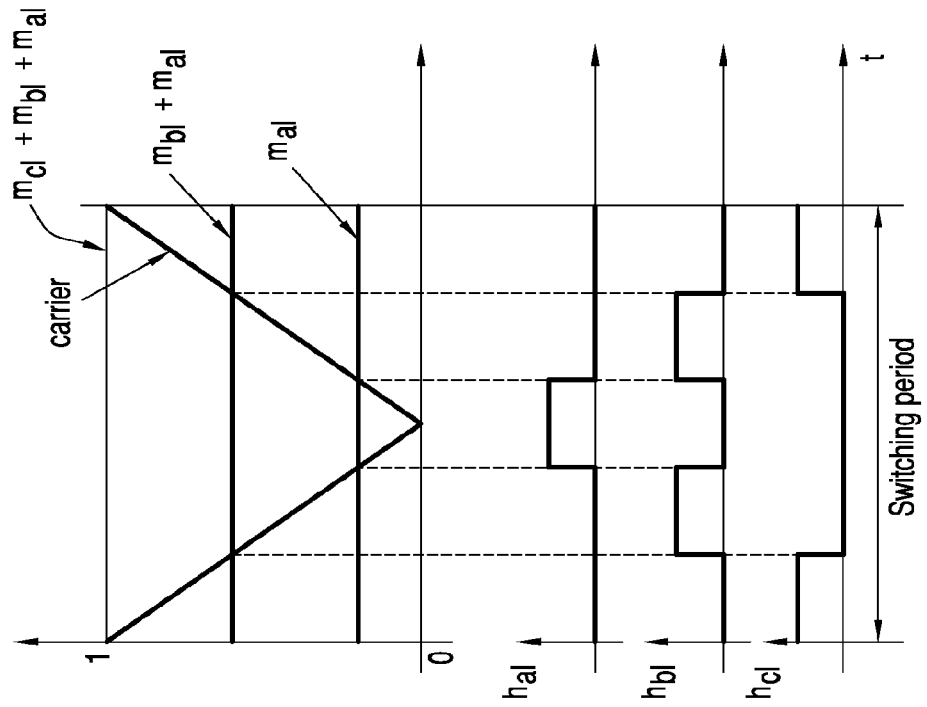
FIG. 6 illustrates a graph of switching functions $h_{au}(t)$, $h_{cu}(t)$, and $h_{bu}(t)$ for the three switches of FIG. 5, as triggered during a switching period, based on a comparison between respective modulation functions $m_{au}$, $m_{cu}$, and $m_{bu}$ of FIG. 4 and a carrier signal of a modulation mechanism, according to the embodiment of FIG. 3.
Figure 7:
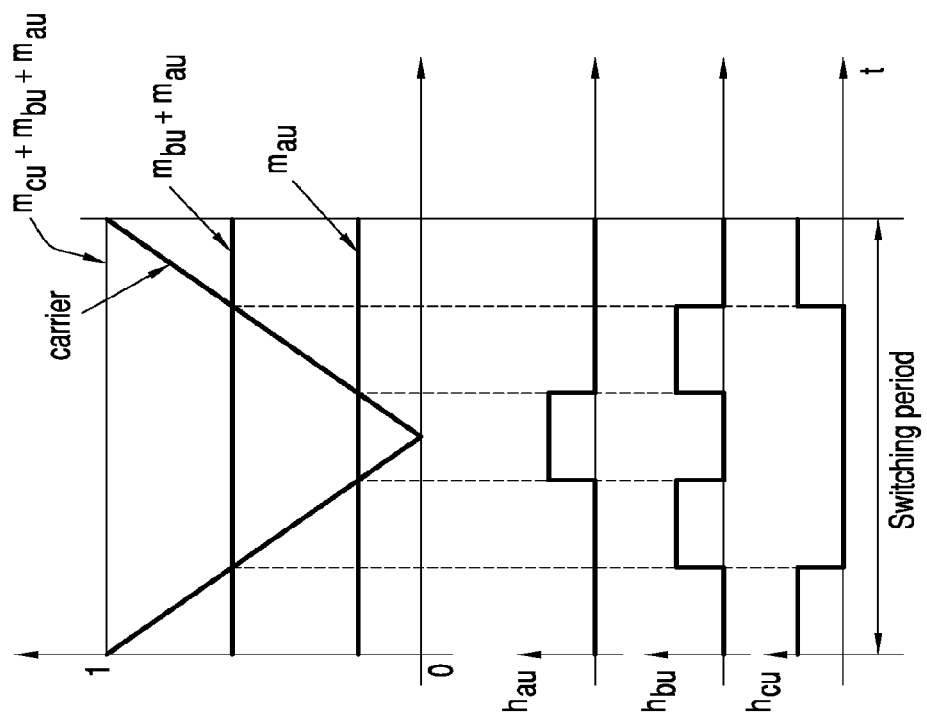
FIG. 7 illustrates a graph of switching functions $h_{al}(t)$, $h_{al}(t)$, $h_{bl}(t)$ for the three switches of FIG. 4, as triggered during a switching period, based on a comparison between respective modulation functions $m_{al}$, $m_{cl}$, and $m_{bl}$ of FIG. 5 and the carrier signal of the modulation mechanism of FIG. 6, according to the embodiment of FIG. 3.

FIG. 6 presents a graph of switching functions $h_{au}(t)$, $h_{cu}(t)$, and $h_{bu}(t)$ for respective switches 314-316, as triggered during a switching period, based on a comparison between respective modulation functions $m_{au}$, $m_{cu}$, and $m_{bu}$ and the carrier signal of the modulation mechanism. As seen in FIG. 6, the modulation mechanism of power converter 31 is configured to assert switching function $h_{au}(t)$ to enable switch 311 during the time that modulation function $m_{au}$ is greater than the carrier signal. Similarly, switching function $h_{bu}(t)$ is asserted to turn on switch 313 during the time that $m_{au} + m_{bu}$ is greater than the carrier signal, but, in accordance with Equation 21, not during the time that $h_{au}(t)$ is asserted. Similarly, switching function $h_{cu}(t)$ is asserted to turn on switch 312 during the time that $m_{au} + m_{bu} + m_{cu}$ is greater than the carrier signal, but, in accordance with Equation 21, not during the time that any of $h_{au}(t)$ or $h_{bu}(t)$ is asserted. FIG. 7 is similar to FIG. 6, but presents a graph of switching functions $h_{al}(t)$, $h_{cl}(t)$, $h_{bl}(t)$ for respective switches 311-313 as triggered during a switching period based on a comparison between respective modulation functions $m_{al}$, $m_{cl}$, and $m_{bl}$ and the carrier signal of the modulation mechanism. As seen from FIGS. 6 and 7, switches 311 and 314 can be cycled on and off at the same time; switches 312 and 315 can be cycled on an off at the same time; and switches 313 and 316 can be cycled on and off at the same time.

The carrier signal used in the present example to trigger the switching of the switch set of power converter 31 comprises a frequency much faster than the frequency of power grid 13, and the switch set of power converter 31 is thus cycled at correspondingly faster rates. As a result, the switching period shown in FIGS. 6-7 is only a fraction of the modulation period shown in FIGS. 4-5. In some examples, the switch set can be cycled at a rate of between approximately 5 kilohertz to approximately 20 kilohertz. With the ripple effect at low frequencies effectively canceled via the switching and modulation functions above, inductor 310 is then mainly subjected only to the higher frequencies associated with the faster switching periods at which the switch set of power converter 31 is switched. This scenario has the effect of increasing the impedance of inductor 310 at lower inductance values, thereby permitting the use of smaller and more efficient inductors like inductor 310, compared to inductor 110 (FIG. 1).

Figure 8:
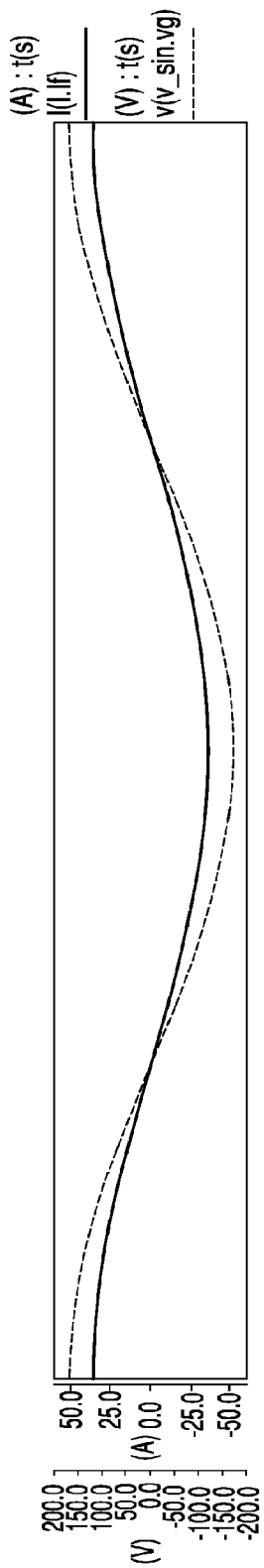
FIG. 8 illustrates a plot of grid voltage $v_g$ and grid current $i_g$ injected to a power grid by the power converter of the embodiment of FIG. 3.
Figure 9:
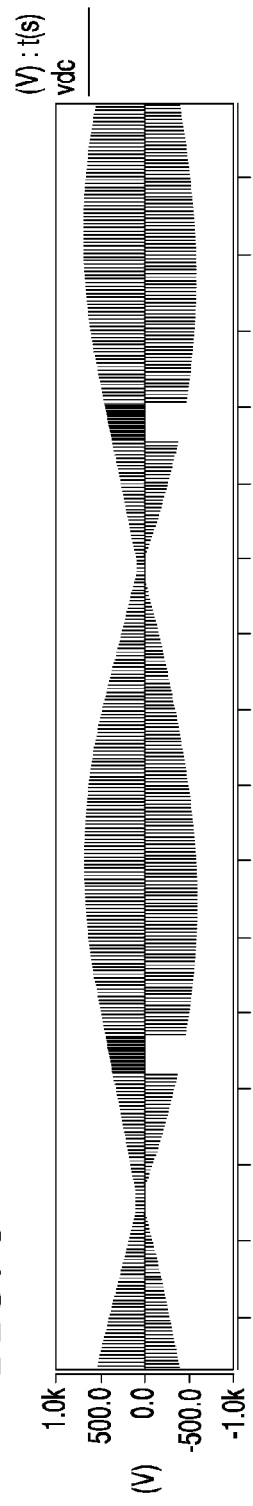
FIG. 9 illustrates a plot of DC-link voltage $v_{dc}$ as modulated by the modulation mechanism of FIG. 6, according to the embodiment of FIG. 3.
Figure 10:
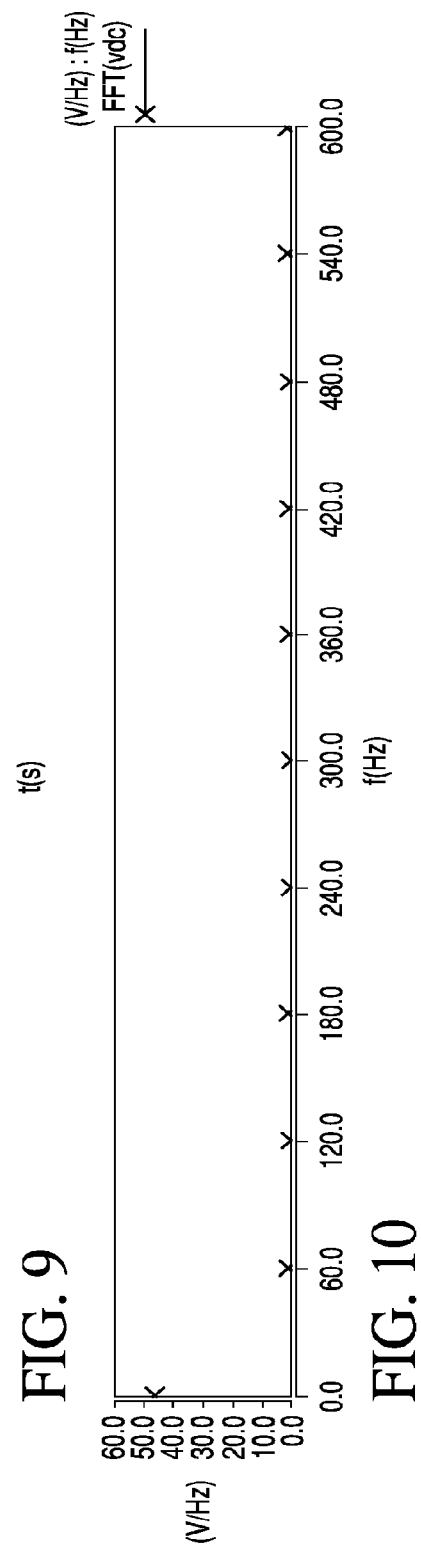
FIG. 10 illustrates a plot of a spectrum of the DC-link voltage of FIG. 9, according to the embodiment of FIG. 3.

FIGS. 8-10 present results of a simulation of power conversion system 3 of FIG. 3 utilizing the modulation mechanism described above. FIG. 8 illustrates a plot of grid voltage $v_g$ and grid current $i_g$ injected to power grid 13 by power converter 31. FIG. 9 illustrates a plot of DC-link voltage $v_{dc}$ as modulated by the modulation mechanism. FIG. 10 illustrates a plot of the spectrum of the DC-link voltage of FIG. 9. In particular, FIG. 10 shows the absence of ripple effect at 120 Hz or twice the frequency of power grid 13, thereby confirming the effective cancellation of $p_2(t)$ from Equation 12 by maintaining the target magnitude $I_f$ and target phase $\phi_{ib}$ for current $i_b$ according to Equation 14.

Figure 11:
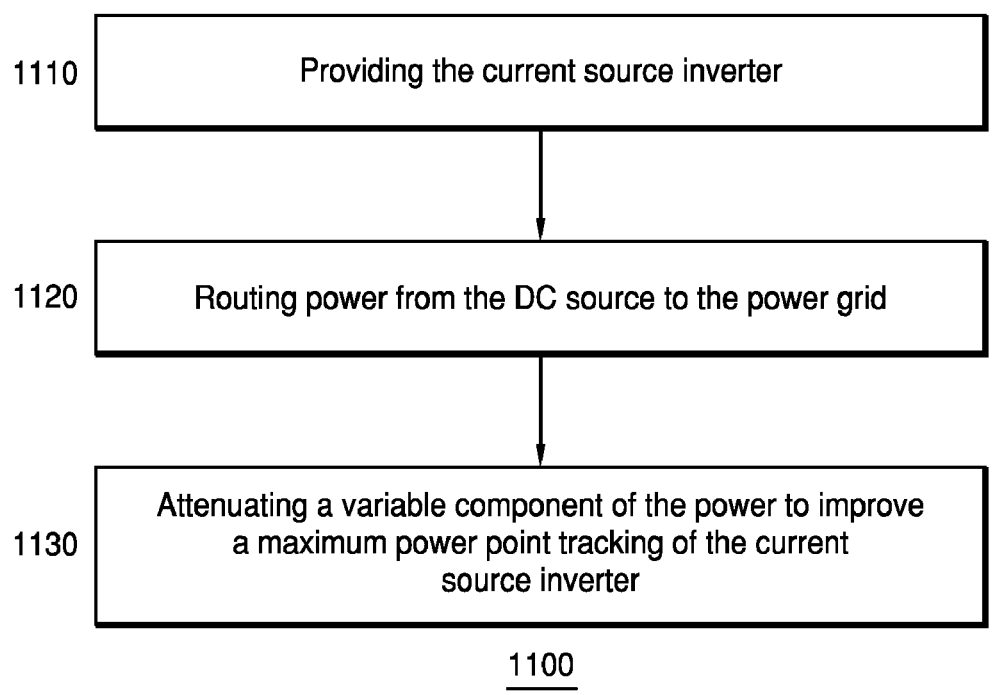
FIG. 11 illustrates a flowchart of a method for operating a current source inverter, according to an embodiment.

Moving along, FIG. 11 presents a flowchart of a method 1100 for operating a current source inverter. In some examples, the current source inverter of method 1100 can be similar to power converter 31 of FIG. 3.

Block 1110 of method 1100 comprises providing the current source inverter. In some examples, providing the current source inverter can comprise coupling the current source inverter between a DC source and a power grid, similar to how power converter 31 couples between DC source 32 and power grid 13 in FIG. 3. In some embodiments, the DC source can couple to the current source inverter of Block 1110 via DC source terminals similar to DC source terminals 321-322 (FIG. 3), while the power grid can couple to the current source inverter via power grid terminals similar to power grid terminals 131-132 (FIG. 3). In at least some embodiments, the current source inverter can be removable from one or more of the DC source or the power grid.

In the same or a different example, providing the current source inverter in Block 1110 can further comprise one or more of providing an inductor coupled to a switch set, providing a first DC source terminal of the DC source coupled to the inductor, providing a first switch of the switch set coupled to a first power grid terminal of the power grid, providing a second switch of the switch set coupled to a second power grid terminal of the power grid, providing a capacitor coupled between a third one of the switches and the second power grid terminal of the power grid. In some examples, providing the current source inverter in Block 1110 can further comprise providing a fourth switch between the first switch and a second DC source terminal, providing a fifth switch between the second switch and the second DC source terminal; and providing a sixth switch between the third switch and the second DC source terminal. In at least some embodiments, such as shown in FIG. 3, the inductor can be similar to inductor 310, the first switch can be similar to switch 311, the second switch can be similar to switch 312, the third switch can be similar to switch 313, the fourth switch can be similar to switch 314, the fifth switch can be similar to switch 315, the sixth switch can be similar to switch 316, and the capacitor can be similar to capacitor 317.

In some embodiments, providing the current source inverter in Block 1110 can also comprise providing a second inductor coupled between the first switch and the first power grid terminal, and providing a second capacitor coupled between the first switch and the second switch to both the second inductor and to the second power grid terminal. In some examples, the second inductor can be similar to inductor 318, while the second capacitor can be similar to capacitor 319 (FIG. 3). In the same or a different embodiment, the second inductor and the second capacitor can form an LC filter.

Block 1120 of method 1100 comprises routing power from the DC source to the power grid via a single phase current source inverter. In the example of FIG. 3, the single phase current source inverter can be similar to power converter 31, which routes power from DC source 32 to power grid 13.

In some examples, routing power in Block 1120 comprises configuring the first switch described in Block 1110 to regulate a first portion of the DC link current between the DC source and the power grid, configuring the second switch described in Block 1110 to regulate a second portion of the DC link current between the DC source and the power grid, and configuring the third switch described in Block 1110 to regulate a reactive current portion of the DC link current routed through the capacitor between the DC source and the power grid. In some embodiments, the DC link current can correspond to DC-link current $i_{dc}$, as described for FIG. 3. Similarly, the first and second portions of the DC link current can respectively correspond to currents $i_a$, and $i_c$, while the reactive current portion can correspond to current $i_b$, as described for FIG. 3.

Block 1130 of method 1100 comprises attenuating a variable component of the power to improve a maximum power point tracking of the current source inverter. In some examples, the variable component of the power can correspond to $p_2(t)$ as described above for Equation 12, and the maximum power point tracking can be as described above with respect to FIG. 2. Attenuating the variable component of the power can in some examples comprise reducing a ripple in the DC link current to generate a substantially constant power transfer to the power grid, similar to the reduction in ripple as shown in FIGS. 8-10 pursuant to the application of Equations 12-14.

In some examples, the attenuation of the variable component of the power in Block 1130 can comprise maintaining an approximate target magnitude and an approximate target phase of the reactive current of the DC link current to maintain a magnitude of the variable component of the power at or proximate to zero. In the same or different examples, the approximate target magnitude and the approximate target phase of the reactive current can be as described above with respect to Equation 14 to maintain $p_2(t)$ in Equation 12 at or proximate to zero. In some embodiments, maintaining the approximate target magnitude and the approximate target phase of the reactive current comprises actuating the switch set of Block 1110 to route the reactive current from the second switch to the second power grid terminal via the capacitor described in Block 1110.

Continuing with Block 1130, in embodiments where the switch set of Block 1110 is actuated to route the reactive current via the capacitor, Block 1130 can comprise controlling control terminals of the switches of the switch set based on a modulation mechanism. In some examples, the modulation mechanism can comprise a space vector modulation scheme. In the example of FIG. 3, the modulation mechanism comprises a pulse width modulation scheme. In the same or a different example, the control terminals of the switches can be controlled via a controller as described above for the controller of power converter 31 for FIG. 3. The attenuation of the variable component of the power in Block 1130 may be subject to constraints with respect to preventing open circuit and short circuit conditions. As a result, Block 1130 may comprise enabling only one of the first, second or third switches of Block 1110 at a time, and/or only one of the fourth, fifth, or sixth switches of Block 1110 at the time.

The use of the modulation mechanism described above for Block 1130 can comprise manipulating switching functions for the switches described for Block 1110 based on modulation functions similar to those described for Equations 17-19. Block 1130 can thus further comprise enabling the switches of the switch set described for Block 1110 based on a comparison of a magnitude of a modulation carrier signal and modulation functions for the switches of the switch set. In the same or a different example, Block 1130 can also comprise configuring the modulation functions to regulate cycling of the switches throughout a modulation period that is based on a frequency of the power grid. The magnitude of the modulation carrier signal can be compared to the magnitude of the modulation functions to enable the switches of the current source inverter, for example, as described above with respect to FIGS. 6-7. In the same or a different example, Block 1130 may comprise cycling the switch set described for Block 1130 at a rate of between approximately 5 kilohertz to approximately 20 kilohertz. In the same or a different example, the switch set may be cycled at a rate between approximately 100 to approximately 500 times faster than a frequency of the power grid. Such fast cycling may permit a reduction in the size or inductance of the inductor described for the current source inverter in Block 1110, in accordance with the description above of inductor 310 (FIG. 3) relative to inductor 110 (FIG. 1).

In some examples, one or more of the different blocks of method 1100 can be combined into a single step or performed simultaneously. For example, blocks 1120 and 1130 can be combined into a single block where the attenuation of the variable component of the power is performed at the same time as the power is routed from the DC source to the power grid via the single phase current source inverter. In the same or a different example, the blocks of method 1100 can be subdivided into several sub-blocks. In the same or a different example, method 1100 can also comprise further or different steps.

Figure 12:
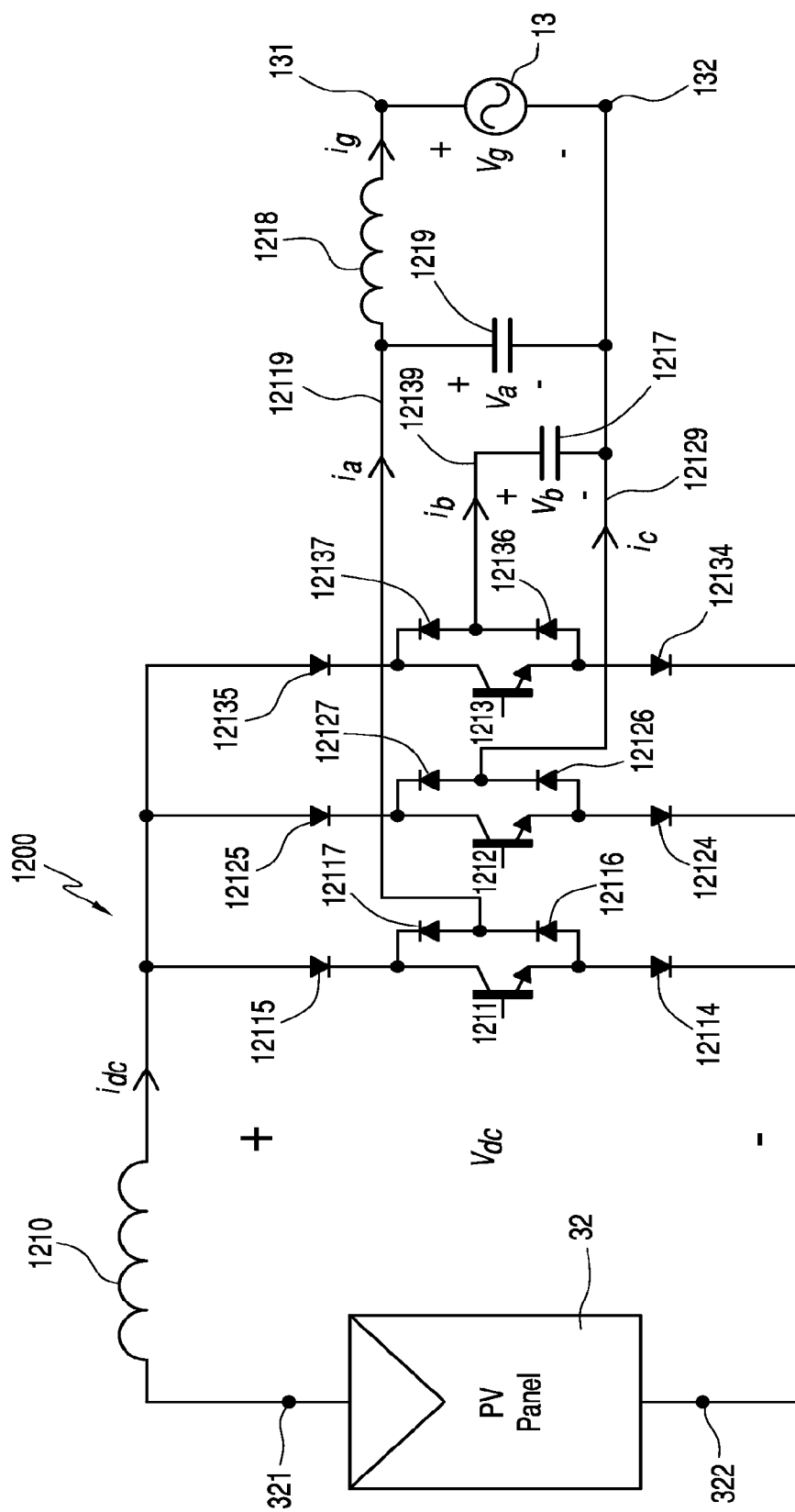
FIG. 12 illustrates a schematic of a power converter system, according to another embodiment.

Continuing with the Figures, a schematic of a power converter system 12 is illustrated in FIG. 12. Power converter system 12 comprises power converter 1200 coupled between DC source 32 and single phase power grid 13. Power converter 1200 is similar to power converter 31 (FIG. 3), but comprises a switch set of only three switches 1211-1213 instead of the six switches 311-316 of the switch set of power converter 31 (FIG. 3). In some examples, switches 1211-1213 can be otherwise similar to the switches of the switch set of power converter 31.

Power converter 1200 also comprises inductor 1210 coupled to DC source 32, where inductor 1210 can be similar to inductor 310 (FIG. 3), and switches 1211-1213 are coupled together to inductor 1210. Capacitor 1217 is coupled between switch 1213 and power grid terminal 132, and can also be similar to capacitor 317 of FIG. 3. Power converter 1200 comprises several electrical paths, such as electrical path 12119 between switch 1211 and power grid terminal 131, electrical path 12129 between switch 1212 and power grid terminal 132, and electrical path 12139 via capacitor 1217 between switch 1213 and power grid terminal 132.

In the example of FIG. 12, power converter 1200 also comprises several diodes coupled to switches 1211-1213. Diode 12115 is coupled between inductor 1210 and switch 1211. Diode 12125 is coupled between inductor 1210 and switch 1212. Diode 12135 is coupled between inductor 1210 and switch 1213. Diode 12114 is coupled between switch 1211 and DC source terminal 322. Diode 12124 is coupled between switch 1212 and DC source terminal 322. Diode 12134 is coupled between switch 1213 and DC source terminal 322.

The present example of FIG. 12 also comprises a feedback loop between opposite terminals of switch 1211 and coupled to electrical path 12119, a feedback loop between opposite terminals of switch 1212 and coupled to electrical path 12129, and a feedback loop between opposite terminals of switch 1213 and coupled to electrical path 12139. In the same or a different embodiment, diodes 12116 and 12117 couple in series along the feedback loop of switch 1211, diodes 12126 and 12127 couple in series along the feedback loop of switch 1212, and diodes 12136 and 12137 couple in series along the feedback loop of switch 1213. In at least some embodiments, such as shown in FIG. 12, a portion of electrical path 12119 couples between diodes 12116 and 12117, a portion of electrical path 12129 couples between diodes 12126 and 12127, and a portion of electrical path 12139 couples between diodes 12136 and 12137. In embodiments where, for example, one or more of switches 1211-1213 comprises a reverse current blocking feature, such as in the case of reverse blocking IGBT (RB-IGBT) or GTO switches, one or more of the diodes described for power converter 1200 may be deleted as redundant.

Similar to power converter 31, power converter 1200 can also be configured via a modulation of switching functions for switches 1211-1213 to restrict a reactive component of power transferred from DC source 32 to power grid 13. In some examples, such configuration can comprise a modulation mechanism similar to that described above for power converter 31 to regulate portion $i_b$ of DC-link current $i_{dc}$ routed through capacitor 1217. The modulation mechanism for power converter 1200 can be configured as described above with respect to Equations 12-14 to maintain the AC component $p_2(t)$ of the transferred power at or proximate to zero by maintaining current $i_b$ at target magnitude $I_b$ and at target phase $\phi_{ib}$ per Equation 14. The modulation functions of Equations 16-19, and the switching functions of Equations 20-21, can be applied to control switches 1211-1213 through switching periods and throughout modulation periods based on the frequency of power grid 13. In light of the above, method 1100 of FIG. 11 would also be applicable to power converter system 12.

Although the power inverters and related methods herein have been described with reference to specific embodiments, various changes may be made without departing from the spirit or scope of the disclosure. For example, even though DC source 32 has been described as comprising PV panels, there can be other embodiments where DC source terminals 321 and 322 couple to other non-photovoltaic DC sources. Additional examples of such changes have been given in the foregoing description. Accordingly, the disclosure of embodiments is intended to be illustrative of the scope of the invention and is not intended to be limiting. It is intended that the scope of this application shall be limited only to the extent required by the appended claims. The power inverters and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An apparatus comprising:
a DC source port comprising:
  a first DC source terminal; and
  a second DC source terminal;
a first switch;
a second switch;
a third switch wherein first terminals of the first, second, and third switches are coupled together;
a fourth switch between the first switch and the second DC source terminal;
a fifth switch between the second switch and the second DC source terminal;
a sixth switch between the third switch and the second DC source terminal;
a first inductor coupled between the first DC source terminal and the first terminals of the first, second, and third switches;
a power grid port comprising:
  a first power grid terminal; and
  a second power grid terminal;
a first electrical path between a second terminal of the first switch and the first power grid terminal;
a second electrical path between a second terminal of the second switch and the second power grid terminal;
a first capacitor;
a third electrical path through the first capacitor and between a second terminal of the third switch and the second power grid terminal;
a second inductor between the first switch and the first power grid terminal and between the fourth switch and the first power grid terminal; and
a second capacitor between the first switch and the second power grid terminal and between the fourth switch and the second power grid terminal;
wherein:
  the first, second, and third switches are configured to distribute portions of a DC link current through the apparatus;
  the first capacitor is larger than the second capacitor;
  the first inductor is larger than the second inductor;
  power ratings of the first and second switches are greater than a power rating of the third switch;
  power ratings of the fourth and fifth switches are greater than a power rating of the sixth switch;
  at least one of the first, second, third, fourth, fifth, or sixth switches comprises at least one of a GTO switch, an IGBT switch, a BJT switch, a bipolar transistor switch, a field effect transistor switch, or a MOSFET switch;
  the first inductor comprises an inductance of between approximately 1 millihenry and approximately 10 millihenries;
  the first capacitor comprises a capacitance of between approximately 100 microfarads and approximately 200 microfarads; and
  the third switch is configured to route an alternating current portion of the DC link current through the first capacitor to attenuate a current ripple effect of the DC link current and improve a maximum power point tracking of the apparatus.

2. The apparatus of claim 1, further comprising:
a first diode between the first switch and the second inductor and between the first switch and the second capacitor;
a second diode between the second switch and the second power grid terminal;
a third diode between the third switch and the first capacitor;
a fourth diode between the fourth switch and the second DC source terminal;
a fifth diode coupled between the sixth switch and the second DC source terminal; and
a sixth diode between the sixth switch and the second DC source terminal.

3. The apparatus of claim 1, wherein:
the controller is configured to cycle the first, second, third, fourth, fifth, and sixth switches at a frequency of between approximately 5 kilohertz to approximately 20 kilohertz via a pulse width modulation mechanism to maintain the alternating current portion of the DC link current approximately at a target magnitude and approximately at a target phase to thereby provide substantially constant power transfer from the DC source port to the power grid port.

4. The apparatus of claim 1, wherein:
the controller is configured to cycle the first, second, and third switches at a frequency of approximately between 5 to 20 kilohertz via a pulse width modulation mechanism to maintain the alternating current portion of the DC link current approximately at a target magnitude and approximately at a target phase to thereby provide substantially constant power transfer from the DC source port to the power grid port.

5. The apparatus of claim 1, wherein:
the DC source port is designed to be coupled to a DC source; and
the DC source comprises a photovoltaic panel.

6. An apparatus comprising:
a DC source port comprising:
  a first DC source terminal; and
  a second DC source terminal;
a first switch;
a second switch;
a third switch wherein first terminals of the first, second, and third switches are coupled together;

a first feedback loop from a second terminal of the first switch to the first terminal of the first switch;
a second feedback loop from a second terminal of the second switch to the first terminal of the second switch;
a third feedback loop from a second terminal of the third switch to the first terminal of the third switch;
a first inductor coupled between the first DC source terminal and the first terminals of the first, second, and third switches;
a power grid port comprising:
 a first power grid terminal; and
 a second power grid terminal;
a first electrical path between the first feedback loop and the first power grid terminal;
a second electrical path between the second feedback loop and the second power grid terminal;
a first capacitor;
a third electrical path through the first capacitor and between the third feedback loop and the second power grid terminal;
a second inductor between the first feedback loop and the first power grid terminal; and
a second capacitor between the first feedback loop and the second power grid terminal;
wherein:
 the first, second, and third switches are configured to distribute portions of a DC link current through the apparatus;
 the first capacitor is larger than the second capacitor;
 the first inductor is larger than the second inductor;
 power ratings of the first and second switches are greater than a power rating of the third switch;
 at least one of the first, second, and third switches comprises at least one of a GTO switch, an IGBT switch, a BJT switch, a bipolar transistor switch, a field effect transistor switch, or a MOSFET switch;
 the first inductor comprises an inductance of between approximately 1 millihenry and approximately 10 millihenries;
 the first capacitor comprises a capacitance of between approximately 100 microfarads and approximately 200 microfarads; and
 the third switch is configured to route an alternating current portion of the DC link current through the first capacitor to attenuate a current ripple effect of the DC link current and improve a maximum power point tracking of the apparatus.

7. The apparatus of claim 6, further comprising:
first and second diodes coupled in series in the first feedback loop;
third and fourth diodes coupled in series in the second feedback loop; and
fifth and sixth diodes coupled in series in the third feedback loop;
wherein:
 the first electrical path couples to the first feedback loop between the first and second diodes;
 the second electrical path couples to the second feedback loop between the third and fourth diodes; and
 the third electrical path couples to the third feedback loop between the fifth and sixth diodes.

8. The apparatus of claim 6, further comprising:
a first diode coupled between the first inductor and the first terminal of the first switch;
a second diode coupled between the first inductor and the first terminal of the second switch;
a third diode coupled between the first inductor and the first terminal of the third switch;
a fourth diode coupled between the second terminal of the first switch and the second DC source terminal;
a fifth diode coupled between the second terminal of the third switch and the second DC source terminal; and
a sixth diode coupled between the second terminal of the third switch and the second DC source terminal.

9. The apparatus of claim 6, wherein:
the DC source port is designed to be coupled to a DC source; and
the DC source comprises a photovoltaic panel.

10. A method comprising:
routing power from a DC source to a power grid via a single phase current source inverter;
attenuating a variable component of the power to improve a maximum power point tracking of the current source inverter, wherein attenuating the variable component of the power comprises maintaining an approximate target magnitude and an approximate target phase of a reactive current of the DC link current to maintain a magnitude of the variable component of the power at or proximate to zero;
and
providing the single phase current source inverter, wherein providing the single phase current source inverter comprises:
 providing a first inductor coupled to a switch set;
 providing a first DC source terminal of the DC source coupled to the first inductor;
 providing a first switch of the switch set coupled to a first power grid terminal of the power grid;
 providing a second switch of the switch set coupled to a second power grid terminal of the power grid; and
 providing a first capacitor coupled between a third switch of the switch set and the second power grid terminal of the power grid.

11. The method of claim 10, wherein:
attenuating the variable component of the power further comprises
 reducing a ripple of a DC link current from the DC source to provide a substantially constant power transfer to the power grid.

12. The method of claim 11, wherein:
providing the current source inverter further comprises:
 providing a second inductor coupled between the first switch and the first power grid terminal; and
 providing a second capacitor coupled between the first switch and the second switch, to the second inductor, and to the second power grid terminal.

13. The method of claim 11, wherein:
routing the power from the DC source to the power grid comprises:
 configuring the first switch to regulate a first portion of the DC link current between the DC source and the power grid;
 configuring the second switch to regulate a second portion of the DC link current between the DC source and the power grid; and
 configuring the third switch to regulate the reactive current routed through the first capacitor between the DC source and the power grid.

14. The method of claim 11, wherein:
attenuating the variable component of the power comprises:
 enabling only one of the first, second, or third switches at a time.

15. The method of claim 14, wherein:
providing the current source inverter further comprises:
- providing a fourth switch between the first switch and a second DC source terminal;
- providing a fifth switch between the second switch and the second DC source terminal; and
- providing a sixth switch between the third switch and the second DC source terminal; and attenuating the variable component of the power further comprises:
- enabling only one of the fourth, fifth, or sixth switches at the time.

16. The method of claim 10, wherein:
maintaining the approximate target magnitude and the approximate target phase of the reactive current comprises:
- actuating the switch set to route the reactive current from the second switch to the second power grid terminal via the first capacitor.

17. The method of claim 10, wherein:
attenuating the variable component of the power comprises:
- controlling control-terminals of the first, second, and third switches of the switch set based on a modulation mechanism comprising at least one of:
  - a pulse width modulation scheme; or
  - a space vector modulation scheme.

18. The method of claim 14, wherein:
enabling only one of the first, second, or third switches at the time comprises at least one of:
- cycling the switch set at a rate of between approximately 5 kilohertz to approximately 20 kilohertz,
- cycling the switch set at a rate between approximately 100 to approximately 500 times faster than a frequency of the power grid, or
- enabling the switches of the switch set based on a comparison of a magnitude of a modulation carrier signal and modulation functions for the first, second, and third switches of the switch set.

19. The method of claim 18, wherein when enabling only one of the first, second, or third switches at the time comprises enabling the switches of the switch set based on a comparison of a magnitude of a modulation carrier signal and modulation functions for the first, second, and third switches of the switch set, enabling only one of the first, second, or third switches at the time further comprises:
- configuring the modulation functions to regulate cycling of the switches throughout a modulation period that is based on a frequency of the power grid.

20. The method of claim 19, wherein:
the modulation period corresponds to a frequency of between approximately 50 Hertz to approximately 150 Hertz.

21. The method of claim 10, wherein:
the steps of routing the power and of attenuating the variable component of the power occur simultaneously.

22. A bridge circuit comprising:
a DC source port comprising:
- a first DC source terminal; and
- a second DC source terminal;

a switch set comprising at least three switches coupled together;
a first inductor coupled between the first DC source terminal and the switch set;
a power grid port comprising:
- a first power grid terminal coupled to a first switch of the switch set; and
- a second power grid terminal coupled to a second switch of the switch set;

a first capacitor coupled between a third switch of the switch set and the second power grid terminal;
a first electrical path between a second terminal of the first switch and the first power grid terminal;
a second electrical path between a second terminal of the second switch and the second power grid terminal; and
a third electrical path via the first capacitor between a second terminal of the third switch and the second power grid terminal;

wherein:
- the first and second DC source terminals are configured to couple the bridge circuit to a DC source;
- the first inductor is coupled to first terminals of the first, second, and third switches; and
- the first capacitor is coupled between the second terminals of the second and third switches.

23. The bridge circuit of claim 22, wherein:
the switch set is configured to regulate a current routed through the first capacitor to restrict a reactive component of a power transferred from the DC source port to the power grid port.

24. The bridge circuit of claim 22, further comprising:
a second inductor coupled between the first switch and the first power grid terminal; and
a second capacitor coupled between the first switch and the second switch, to the second inductor, and to the second power grid terminal.

25. The bridge circuit of claim 22, wherein:
the switch set further comprises:
- a first diode coupled between the first switch and the first power grid terminal;
- a second diode coupled between the second switch and the second power grid terminal; and
- a third diode coupled between the third switch and the first capacitor.

26. The bridge circuit of claim 22, wherein:
the switch set further comprises:
- a fourth switch coupled between the first switch and the second DC source terminal;
- a fifth switch coupled between the second switch and the second DC source terminal; and
- a sixth switch coupled between the third switch and the second DC source terminal.

27. The bridge circuit of claim 22, wherein:
the DC source port is designed to be coupled to a DC source; and
the DC source comprises a photovoltaic panel.

28. The bridge circuit of claim 22, wherein:
the switch set is configured to regulate a DC link current between the DC source port and the power grid port;
the first switch is configured to regulate a first portion of the DC link current routed between the DC source port and the first power grid terminal;
the second switch is configured to regulate a second portion of the DC link current routed between the DC source port and the second power grid terminal; and
the third switch is configured to regulate a third portion of the DC link current routed through the first capacitor between the DC source port and the second power grid terminal.

29. The bridge circuit of claim 22, further comprising:
a controller coupled to the switch set at control terminals of the at least three switches;
wherein the controller is configured to enable only one of the first, second, or third switches at a time.

30. The bridge circuit of claim 22, wherein:
power ratings of the first and second switches are greater than a power rating of the third switch.

31. The bridge circuit of claim 22, wherein:
the power grid port is designed to be coupled to a power grid comprising at least one of:
a residential power grid; or
a public power grid;
and
the bridge circuit is configured to transfer power from the DC source port to the power grid.

32. The bridge circuit of claim 22, wherein:
the bridge circuit comprises a single phase inverter circuit.

* * * * *